United States Patent
Fischer

[11] Patent Number: 6,021,869
[45] Date of Patent: Feb. 8, 2000

[54] LIFT TRUCK

[75] Inventor: Horst Fischer, Oberhausen, Germany

[73] Assignee: ICE Cargo Equipment Aktiengesellschaft, Cham, Switzerland

[21] Appl. No.: 09/158,251

[22] Filed: Sep. 22, 1998

[30] Foreign Application Priority Data

Sep. 22, 1997 [DE] Germany .......................... 197 41 764

[51] Int. Cl.⁷ ............................................. B66F 9/22
[52] U.S. Cl. .................... 187/234; 187/233; 187/238; 187/231; 187/269
[58] Field of Search ............................ 187/231, 233, 187/234, 235, 236, 237, 222, 211, 238, 225; 414/629, 632, 642

[56] References Cited

U.S. PATENT DOCUMENTS

| | | | |
|---|---|---|---|
| 3,202,233 | 8/1965 | Dolphin et al. ................... | 187/231 X |
| 3,485,323 | 12/1969 | Ulinski .............................. | 187/234 X |
| 3,534,664 | 10/1970 | Ulinski .............................. | 187/234 X |
| 4,065,012 | 12/1977 | Rocco ............................... | 414/642 X |
| 4,520,903 | 6/1985 | Arnold et al. ..................... | 187/222 |
| 5,722,511 | 3/1998 | Wakamiya ......................... | 187/231 |
| 5,752,584 | 5/1998 | Magoto et al. .................... | 187/233 X |

FOREIGN PATENT DOCUMENTS

| | | | |
|---|---|---|---|
| 000271707 | 12/1964 | Australia ........................... | 187/231 |
| 405201698 | 8/1993 | Japan ................................. | 187/233 |
| 000191610 | 9/1964 | Sweden ............................. | 187/231 |
| 002190896 | 12/1987 | United Kingdom ............... | 187/231 |

*Primary Examiner*—Robert P. Olszewski
*Assistant Examiner*—Steven B. McAllister
*Attorney, Agent, or Firm*—Herbert L. Lerner; Laurence A. Greenberg

[57] ABSTRACT

A lift truck, especially for use in air cargo handling, includes a drive part having at least one driving wheel and a load part guided at the drive part and having at least one roller. Two lifting devices are operable in sequence. The lifting devices each set a height of the load part relative to the drive part in a respective lifting stage.

9 Claims, 5 Drawing Sheets

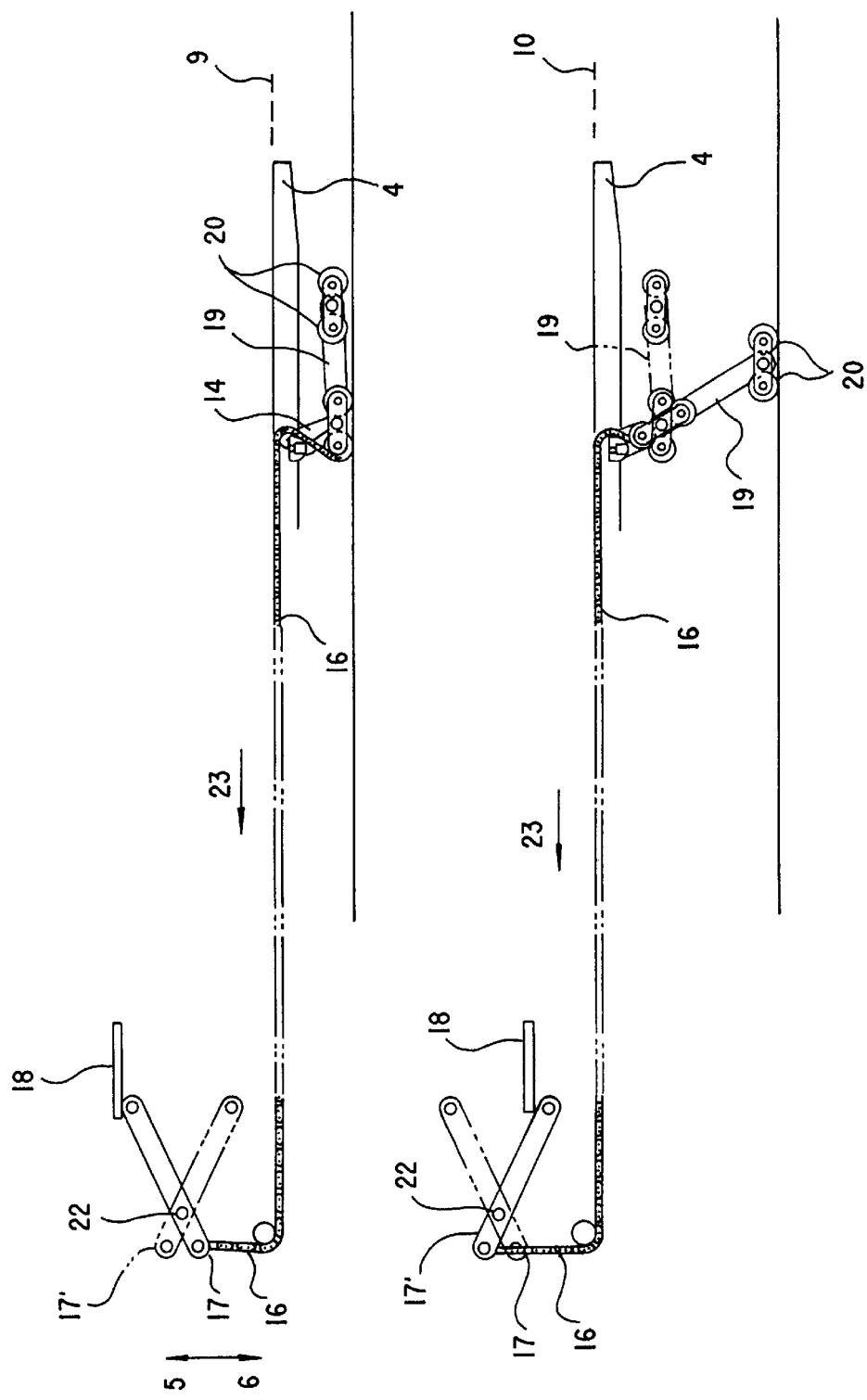

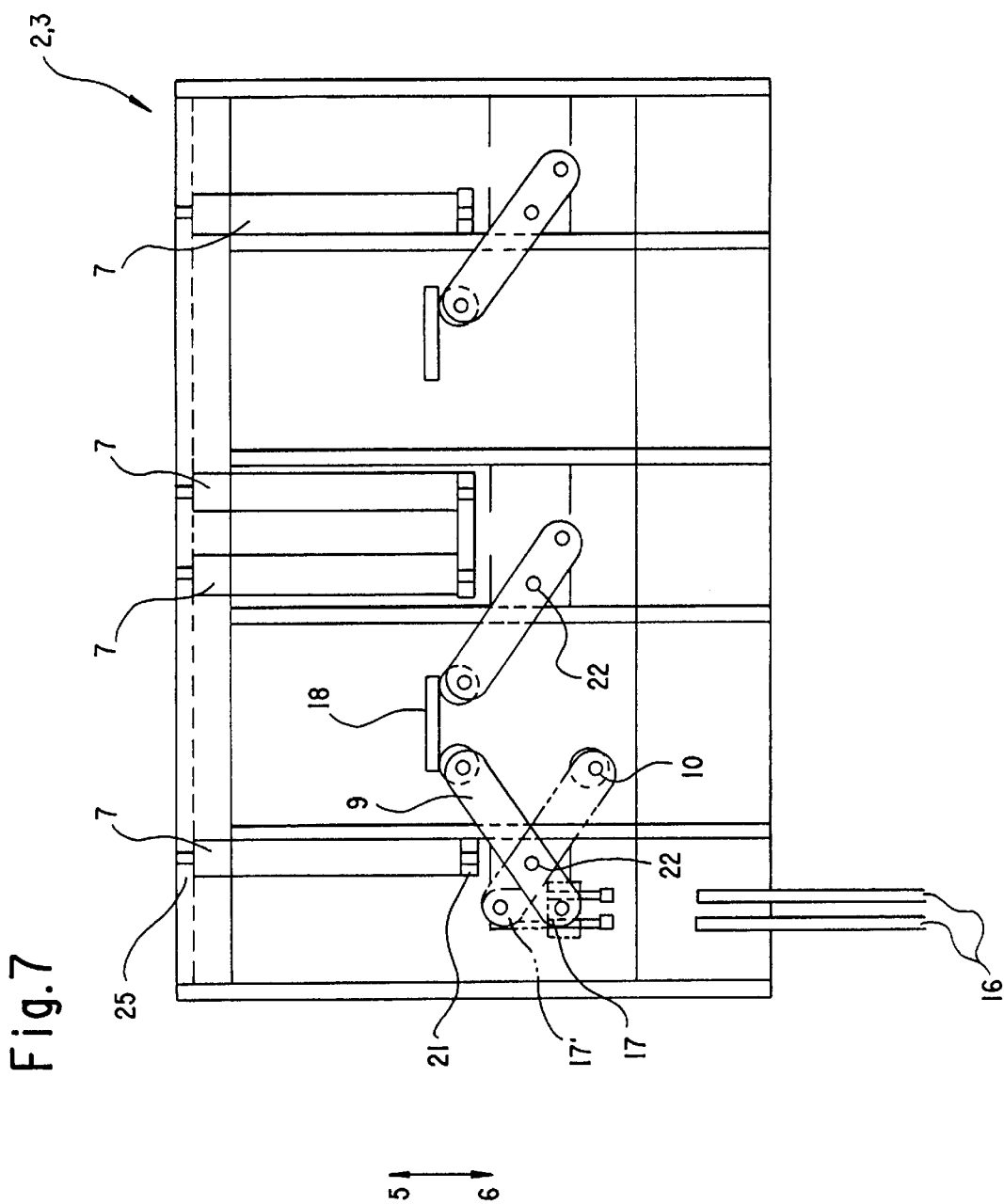

LIFT TRUCK

BACKGROUND OF THE INVENTION

1. Field of the Invention

The invention relates to a lift truck, especially for use in air cargo handling, including a drive part having at least one driving wheel, and a load part guided at the drive part, the load part having at least one roller and being height-adjustable relative to the drive part through the use of a lifting device.

Such lift trucks are already known in a variety of types. Thus, for example, German Patent DE 25 24 163 C as well as German Published, Non-Prosecuted Patent Application DE 38 08 007 A1 already disclose elevating a fork through the use of rollers swiveled out by a push rod. However, the disadvantage in that type of lift truck is that the achievable lift is relatively small.

Further types of lift trucks make use, for example, of a scissors lift principle with which a lift of up to approximately 800 mm may be achieved.

Employing a lift truck for air cargo handling necessitates handling relatively heavy loads amounting up to roughly 7 tons. Those loads need to be elevated to a specific, predetermined system height (for example 508 mm). The trucks which are used for that purpose need to be highly maneuverable since airport space availability is limited due to very high floor space prices.

The known structures either fail to handle the relatively high loads or are so bulky that they do not come into question for use in a cramped space situation. In addition thereto the predetermined height needs to be maintained relatively precisely, which likewise involves difficulties with structures known heretofore.

SUMMARY OF THE INVENTION

It is accordingly an object of the invention to provide a lift truck, which overcomes the hereinafore-mentioned disadvantages of the heretofore-known devices of this general type and which is capable of lifting relatively high loads with high precision to predetermined heights both speedily and reliably while taking up relatively little room.

With the foregoing and other objects in view there is provided, in accordance with the invention, a lift truck, especially for use in air cargo handling, comprising a drive part having at least one driving wheel; a load part guided at the drive part, the load part having at least one roller; and two lifting devices operable in sequence, the lifting devices each setting a height of the load part relative to the drive part in a respective lifting stage.

A first lifting device in this configuration is used to first lift the load to be transported from the ground and to elevate it by a relatively small height. In this lowered condition the lift truck can be maneuvered very well and is safe from toppling since its center of gravity is still low.

It is not until the load actually needs to be transferred from the lift truck that the load is elevated to the predetermined height by a second lifting device.

In accordance with another feature of the invention, the first lifting device is configured as a push rod mechanical system, in which a push rod acts on a wheel arm lever through which at least one first roller may be swiveled relative to the load part, the latter then being supported relative to the ground by these rollers.

In accordance with a further feature of the invention, the second lifting device includes a traction device preferably configured as a duplex chain, with which at least one second roller may be swiveled relative to the first roller of the first lifting device. This second roller is disposed at the free first end of a swivel lever which in turn is swivelingly mounted on the wheel arm lever of the first lifting device. The traction device acts correspondingly on an end of this swivel lever located opposite the rollers.

In order to elevate the load it is first accessed from underneath. Then the first lifting device is actuated, followed by transporting the elevated load with the lift truck to the desired location where the second lifting device is actuated so that the load is elevated to the transfer height.

In accordance with again another feature of the invention, the first lifting device has a wheel arm lever on which the swivel lever is swivelingly mounted.

In accordance with again a further feature of the invention, the swivel lever has a second end and a fulcrum located nearer to the second end than the first end, and the traction device acts on the second end.

In accordance with an added feature of the invention, in order to save weight and costs, both lifting devices are actuated by a common lifting apparatus, and this lifting apparatus includes at least one lifting cylinder supported at one end by the frame and at the other end by the load part.

In accordance with an additional feature of the invention, actuating the two lifting devices is carried out by assigning a swiveling element and a stop to each lifting device, wherein the element and the stop are movable relative to each other, or more particularly height-adjustable.

In accordance with yet another feature of the invention, the swiveling elements are disposed on the load part and the stops on the drive part, so that any movement of the load part relative to the drive part automatically results in a movement of the swiveling elements relative to the stops. Each swiveling element is supported by the corresponding stop and is swiveled by the mutual movement for actuating the assigned lifting device.

In accordance with a concomitant feature of the invention, in order to ensure a smooth, safe receival of the load, the load part is provided with several fork arms, preferably three fork arms, each of which is provided with the two cited lifting devices for reasons of stability.

It is self-explanatory that height-adjustability of the load part by the lifting cylinders and the swiveling movement of the rollers of the two lifting devices are adapted to each other so that in every lifting stage the lift truck stands substantially horizontal as a whole.

Other features which are considered as characteristic for the invention are set forth in the appended claims.

Although the invention is illustrated and described herein as embodied in a lift truck, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5 and 6 are enlarged, side-elevational views illustrating the functioning of a second lifting device;

FIG. 7 is a further enlarged, side-elevational view of a lifting device; and

DESCRIPTION OF THE PREFERRED EMBODIMENTS

Figure 1:
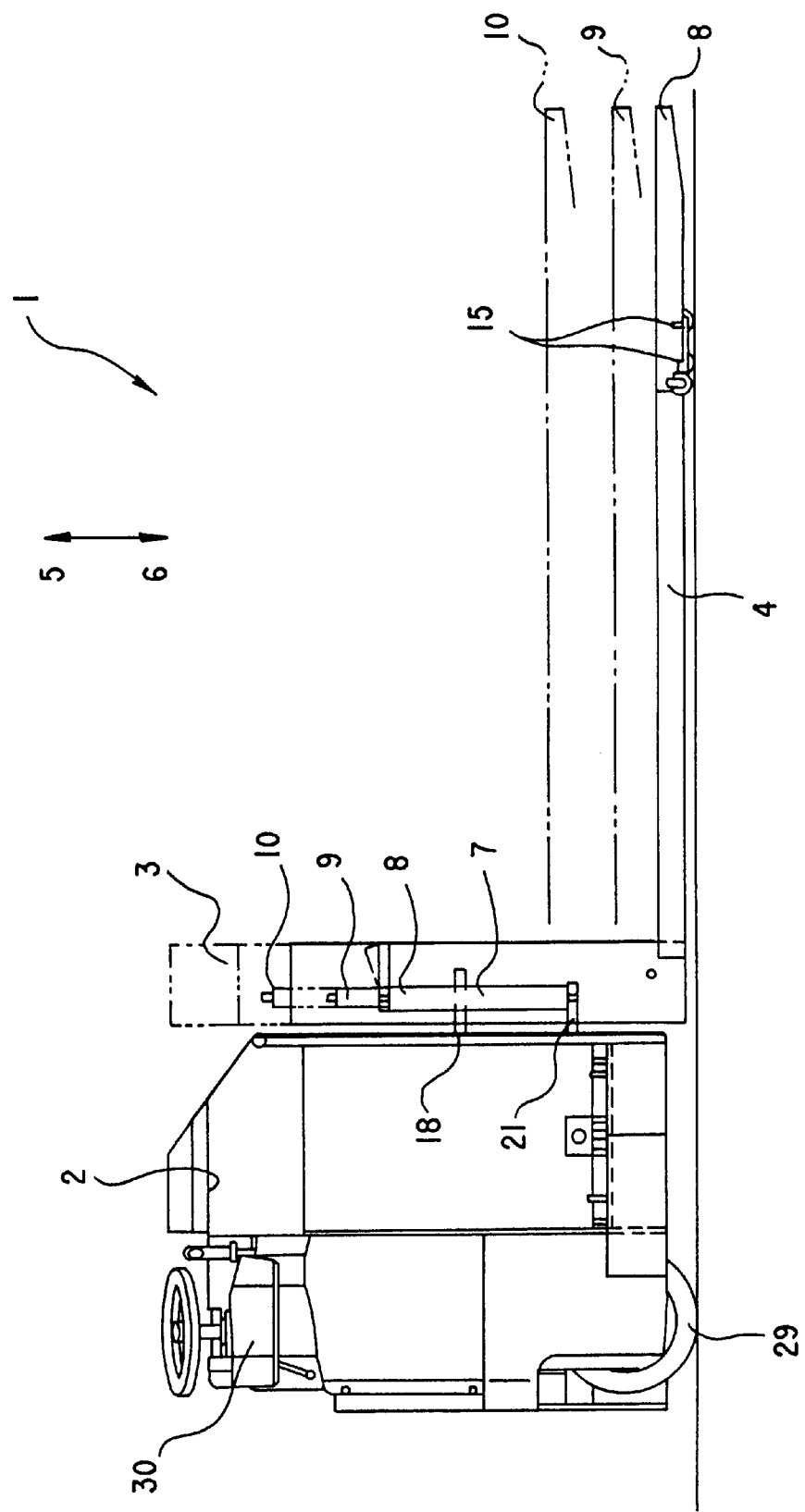
FIG. 1 is a diagrammatic, side-elevational view of a lift truck in accordance with the invention.
Figure 2:
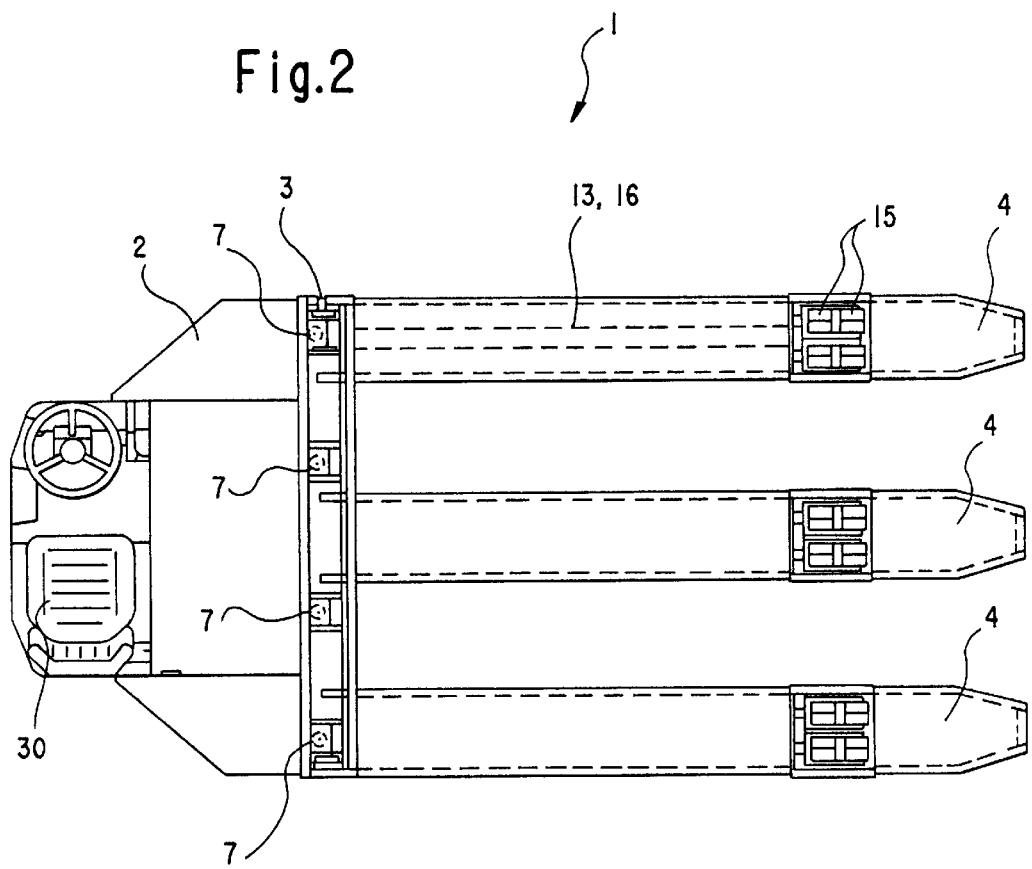
FIG. 2 is a top-plan view of a lift truck in accordance with the invention.

Referring now to the figures of the drawings in detail and first, particularly, to FIGS. 1 and 2 thereof, there is seen a lift truck or fork lift 1 in accordance with the invention. The lift truck 1 includes a drive part 2 on which a load part 3 including fork arms 4 is movably mounted in the direction of arrows 5, 6. Shifting in the direction of the arrows 5, 6 is performed through several rams or lifting cylinders 7.

The drive part 2 is provided with at least one driving wheel 29 and a seating location 30 with a device for controlling the lift truck 1. The drive part 2 also carries an energy storage device, preferably rechargeable batteries and a motor.

The load part 3 may preferably be locked in three positions, namely in a base position 8, a first lifting stage 9 and a second lifting stage 10. Corresponding positions of the lifting cylinders 7 and of the load part 3 are illustrated in each case on the left in FIG. 1.

Figure 3:
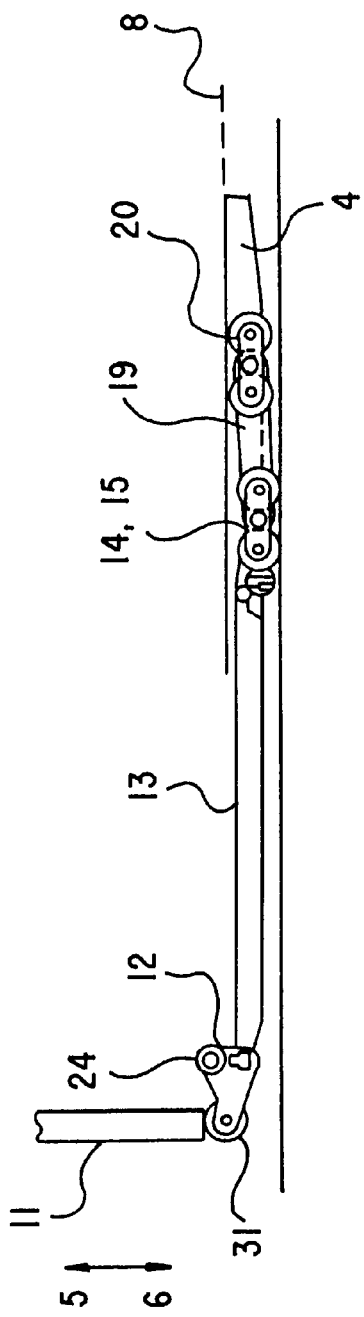
FIGS. 3 and 4 are enlarged, side-elevational views illustrating the functioning of a first lifting device.

Referring now to FIG. 3 it is seen that a first lifting device includes a guide rail 11 located on the drive part 2. The guide rail 11 cooperates with a swivel lever 12 rotatably mounted at a fulcrum 24 of the load part 3. A push rod 13 has one end articulatingly hinged on the swivel lever 12 and another end acting on a wheel arm lever 14 rotatably mounted on the fork arm 4. A free end of the wheel arm lever 14 carries rollers 15.

Figure 4:
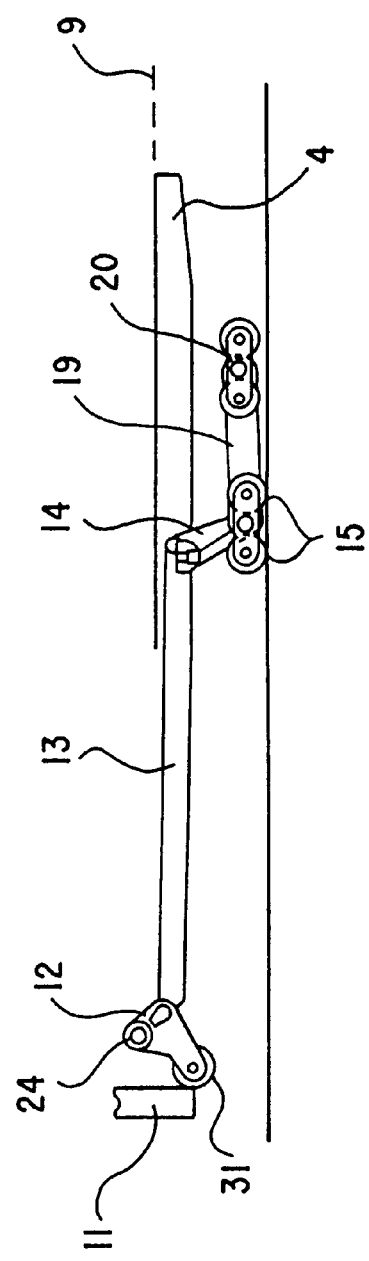

Referring now to FIG. 4 it is evident that actuation of the lifting cylinders 7 elevates the fulcrum 24 in the direction of the arrow 5. A roller 31 disposed on the swivel lever 12 rolls on the guide rail 11, as a result of which the swivel lever 12 is swiveled so that the push rod 13 is moved to the right. The wheel arm lever 14 is thereby moved downwards so that the rollers 15 are swiveled outwardly and the load part 3 including the fork arms 4 is translated into the first lifting stage 9.

Referring now to FIGS. 5 and 6 it is seen that a second lifting device including a chain 16 is provided for further elevating into the second lifting stage 10. This chain 16 is secured at one end to a swivelingly mounted lever 17 supported by a counter hold or stop 18 rigidly mounted on the frame 2. The lever 17 is in turn mounted by its fulcrum 22 on the load part 3. An opposite end of the chain 16 is secured to a swivel arm 19 provided with rollers 20 and rotatably mounted on the wheel arm lever 14.

When the load part 2 is moved by the lifting cylinders 7 in the direction of the arrow 5, this fulcrum 22 is also shifted upwards. As a result, the lever 17 is brought into an illustrated swiveled position 17', thereby moving the chain 16 in the direction of an arrow 23 and hinging the swivel lever 19 downwards. The load part 3 including the fork arms 4 is resultingly elevated into the second lifting stage 10. The load part 3 then rests on the swiveled rollers 20 as is seen from FIG. 6.

In this context it is specifically emphasized that the levers 17, 17' and the counter hold 18 are shown turned through 90° in FIGS. 5 and 6 to make for a better overview. In reality the levers 17 do not run parallel to the fork 4, but rather perpendicular thereto, i.e. parallel to the transverse axis of the lift truck 1 as a whole. This is evident in more detail from FIG. 7.

Referring now to FIG. 7 it is seen that four rams or lifting cylinders 7 are used, each of which includes a fastening 21 at its lower end at the drive part 2 and a fastening 25 at its upper end at the load part 3. The levers 17 may be provided with a roller with which the levers are in contact with the counter hold 18, as a result of which friction is reduced. In this configuration the lever 17' represents the swiveled position of the lever 17 in the second lifting stage 10. Of course, it is also evident that not only one simplex chain 16 but also a duplex chain may be used.

Figure 8:
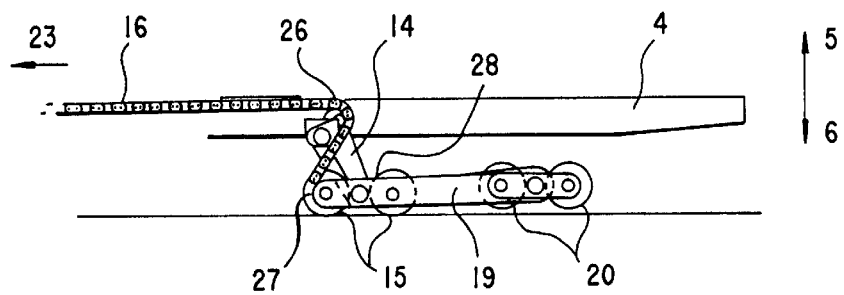
FIG. 8 is a further enlarged view of a portion of FIG. 5.

FIG. 7 illustrates how the chain 16 is actuated, while FIG. 8 shows the effect of this actuation and the corresponding translation into a movement of the swivel lever 19. The chain 16 runs over a pulley 26 and is secured to a hinging point 27 on the swivel lever 19. As illustrated, this hinging point is located to the left of a fulcrum 28 between the swivel arm or lever 19 and the wheel arm lever 14. Therefore, as soon as the chain 16 is drawn in the direction of the arrow 23 it acts through the pulley 26 to exert a corresponding traction force on the hinging point 27. In this configuration the wheel arm lever 14 is arrested by the push rod 13 and is unable to comply. The swivel arm or lever 19 is thus swiveled downwards, with the rollers 20 coming into contact with the ground. In a further movement of the chain 16 in the direction of the arrow 23, the rollers 15 are lifted from contact with the ground. The fork arms 4 rest on the rollers 20. The swivel arm or lever 19 is then further swiveled until the lifting cylinders 7 have attained their predetermined maximum stroke. As is evident from FIG. 6, in this position the swivel arm or lever is preferably located roughly in the elongation of the wheel arm lever 14. The fork 4 is then in the second lifting stage 10, thus permitting load transfer without difficulty. For lowering, the load part 3 travels downwards in the direction of travel 6 due to the lifting cylinders 7, with the lever 17 being hinged inwards. Upon further retraction of the lifting cylinders 7, the wheel arm lever 14 is again released by the push rod 13 and is thus able to swivel back into its position which is evident from FIG. 3.

A horizontal orientation of the fork arms 4 of the load part 3 is made possible over the full stroke through the use of the lifting devices 11–14 and 16–19 which are actuated in sequence for the two lifting stages, thus attaining a system height of 508 mm in the second lifting stage 10 as is standard in air cargo handling. The lift truck 1 furthermore demonstrates high maneuverability even in a cramped space situation.

I claim:

1. A lift truck, comprising:
   a drive part having at least one driving wheel;
   a load part guided at said drive part, said load part having at least one first roller and at least one second roller;
   two lifting devices operable in sequence, said two lifting devices each setting a height of said load part relative to said drive part in a respective lifting stage, a first of said two lifting devices having a wheel arm lever and a second of said two lifting devices having a swivel lever swivellingly mounted on said wheel arm lever, said swivel lever having a free first end and a traction device for swiveling said at least one second roller disposed at said free first end relative to said at least one first roller.

2. The lift truck according to claim 1, wherein said first of said two lifting devices has a push rod cooperating with said wheel arm lever for swiveling said at least one first roller relative to said load part.

3. The lift truck according to claim 1, wherein said traction device is a duplex chain.

4. The lift truck according to claim 1, wherein said swivel lever has a second end and a fulcrum located nearer to said second end than said first end, and said traction device acts on said second end.

5. The lift truck according to claim 1, wherein said lifting devices include at least one lifting cylinder having one end engaging said drive part and another end engaging said load part.

6. The lift truck according to claim 1, including a swiveling element and a stop movable relative to each other for actuating said two lifting devices.

7. The lift truck according to claim 6, wherein said swiveling element is disposed on said load part and said stop is disposed on said drive part.

8. The lift truck according to claim 1, wherein said load part has fork arms.

9. The lift truck according to claim 8, wherein each of said fork arms has two lifting devices.

* * * * *